United States Patent [19]

Bekheet

[11] Patent Number: 4,935,713
[45] Date of Patent: Jun. 19, 1990

[54] FIELD COIL ASSEMBLY FOR AN ELECTROMAGNETICALLY ACTUATED CLUTCH

[75] Inventor: Zaki C. Bekheet, Canton, Mich.

[73] Assignee: Ford Motor Company, Dearborn, Mich.

[21] Appl. No.: 364,418

[22] Filed: Jun. 12, 1989

[51] Int. Cl.$^5$ .............................................. H01F 7/20
[52] U.S. Cl. ................................ 335/296; 29/602.1; 192/84 C
[58] Field of Search ...................... 335/296, 297, 299; 29/602.1; 192/84 B, 84 C

[56] References Cited

U.S. PATENT DOCUMENTS 4,285,421  8/1981  Halsted ............................. 192/84 C

FOREIGN PATENT DOCUMENTS 0192629  11/1982  Japan ................................. 192/84 C
0075140   4/1987  Japan ................................. 192/84 C
0203930   8/1988  Japan ................................. 192/84 C

OTHER PUBLICATIONS

1988 Car Shop Manual, Ford, pp. 36-37-1-4, FIG. 5.

Primary Examiner—George Harris
Attorney, Agent, or Firm—Frank G. McKenzie; Donald J. Harrington

[57] ABSTRACT

A field coil assembly for an electromagnetic clutch includes a coil of current conducting wire, a cap covering an axial end of the coil, a bobbin covering the opposite axial end, a terminal post formed integrally with the bobbin, a terminal inserted within the post, a connector sleeve covering the post and terminal blades, and a coil housing in which the coil is located and retained mechanically. The ends of the coil wire are lead through the holes in the bobbin and supported on bosses molded in the bobbin. The terminals are fitted within apertures in the bobbin, engage the wire ends, cut through the wire insulation, draw a residual portion of the lead wire within the terminal post, and form an electrical contact between the wire and the terminal end. Before the terminal is inserted into the post, the wires and wire supports integral with the post are sheared to a correct length by a knife passing over the top surface of the post.

8 Claims, 5 Drawing Sheets

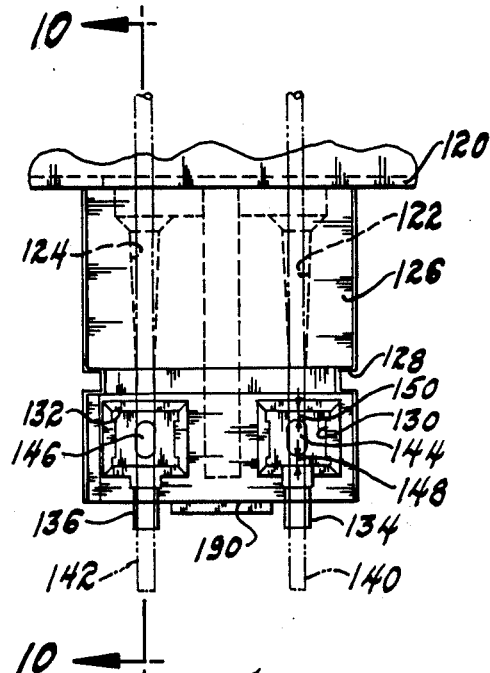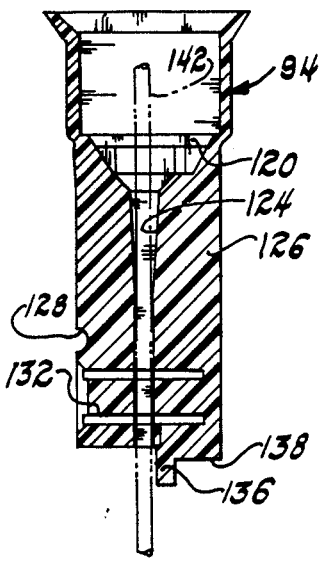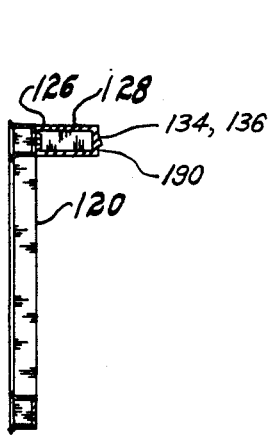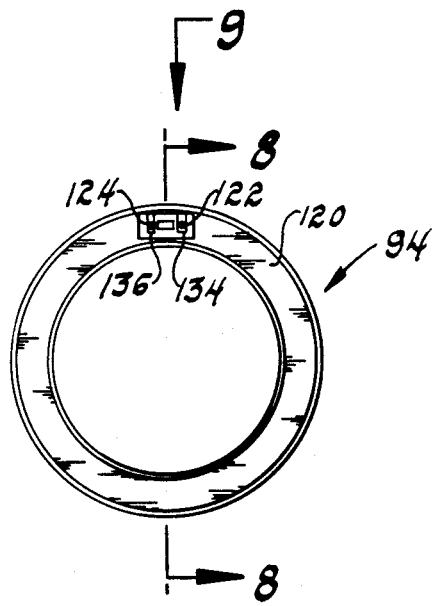

FIELD COIL ASSEMBLY FOR AN ELECTROMAGNETICALLY ACTUATED CLUTCH

BACKGROUND OF THE INVENTION

1. Field of the Invention

This invention pertains to a field coil for actuating an electromagnetically clutch, particularly an automotive accessory drive clutch.

2. Description of the Prior Art

Field coil assemblies in the prior art conventionally include a coil of copper wire in the form of a torus, the coil being located in a housing partially enclosing the coil. Usually the housing contains a space having the general shape of the wire coil, the space being larger than that of the coil to allow locating the coil within the housing. Then, the ends of the wire are lead from the housing to an external terminal connection engageable by an electrical receptacle. The open end of the housing and the space within the housing between the coil and the interior walls of the housing are filled or potted with nonpolymerized plastic resin, which is later cured or polymerized at elevated temperature or room temperature depending upon the duration of a period available to polymerize the resin. The resin flows into the cavity of the housing as a viscous liquid and the ends of the housing are sealed to prevent resin flow from the housing in the less viscous form it has after its temperature is raised and before it polymerizes.

Usually the components of the assembly must be preheated before the epoxy potting is added to the housing, then the resin is heated to the cure temperature and is maintained at that temperature for a predetermined period during which period the resin polymerizes. Care must be taken to assure that the Part has been cooled adequately to room temperature for subsequent handling on an assembly line required to complete the assembly.

Lengthy periods are required to mix the components of the plastic resin, to maintain the mixture at low temperature to prevent its polymerizing before being potted in the housing cavity, and to prevent contamination with foreign substances. Furthermore, the process of potting the coil in the housing with the plastic resin is slow, tedious and susceptible to wasted potted material and spotting and dripping on the surfaces of the housing. The costs associated with preheating the components before potting, heating them in an oven to a cure temperature, controlling the cooling rate and guarding against later handling while hot are difficulties with this method of field coil assembly for which solutions have long been sought.

SUMMARY OF THE INVENTION

The field coil assembly of the present invention includes a spool of current carrying insulated wire in the form of a torus having two axial ends. A molded plastic cap in the form of a ring having axially extending flanges is fitted over one end of the coil to insulate and space the walls of the housing from the external environment. Similarly, at the opposite axial end of the coil, a molded plastic bobbin having axially extending flanges is fitted over the other end of the coil to electrically insulate the coil from the housing. The housing is in the form of a torus having internal and external walls. With the coil seated on a closed end of the housing, material from the internal or external housing wall is upset and deformed by swaging into the annular region of the housing against an external surface of the end cap, thereby fixing the coil and retaining it in position in the housing seated at the closed end against a closed surface of the housing and retained there by the swaged wall material.

The field coil assembly also includes a terminal post formed integrally with the bobbin, a terminal clip inserted within the post and having the capacity to cut through the wire insulation during the process of inserting and retaining the terminal in the post, and a connector sleeve covering the Post and terminal blades. The ends of the wire are lead through holes in the bobbin and are supported on bosses molded in the bobbin post. The ends of the terminals are fitted within apertures in the bobbin, engage the wire end, cut through the wire insulation, draw a residual portion of the lead wire within the terminal post, and form an electrical contact between the wire and the terminal end. Before the terminal is inserted into the post, lead wires and wire supports integral with the post are sheared to a correct length by a knife passing over the top surface of the post and through the wire.

BRIEF DESCRIPTION OF THE DRAWINGS

FIG. 7 is a top view of a field coil bobbin;

FIG. 8 is a cross section taken at plane 8—8 of FIG. 7;

FIG. 9 is a side view taken in direction 9—9 in FIG. 7 of the field coil bobbin;

FIG. 10 is a cross section taken at plane 10—10 of FIG. 9;

DESCRIPTION OF THE PREFERRED EMBODIMENT

Figure 1:
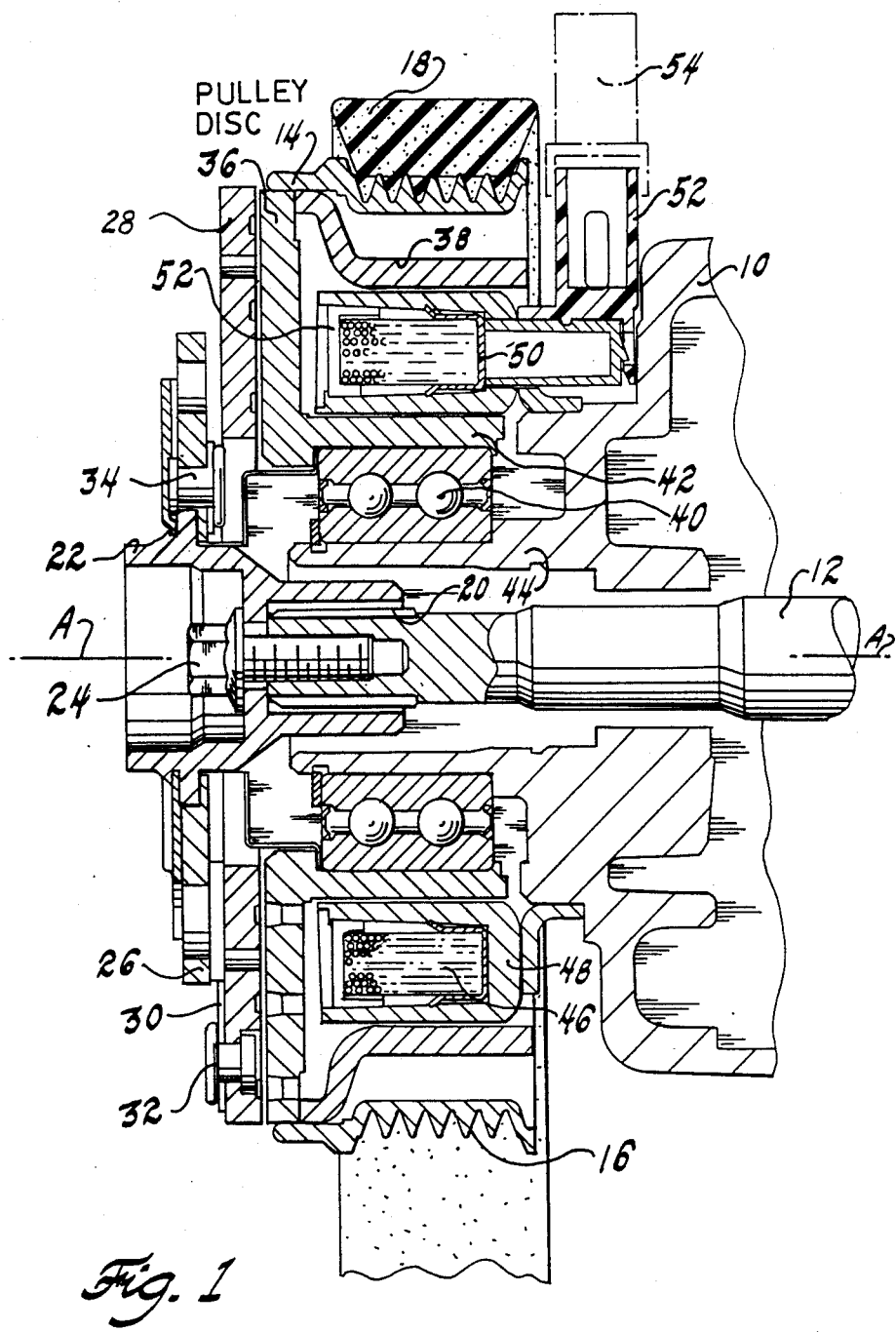
FIG. 1 is a cross section through a belt-driven pulley assembly for an electromagnetic automotive accessory clutch.

Referring first to FIG. 1, an accessory, such as an air conditioning system compressor, is shown in position adjacent an accessory clutch assembly for drivably connecting and disconnecting the driveshaft 12 of the compressor and sheave 14. The outer surface 16 of the sheave is drivably engaged by an endless rubber drive belt 18 whose inner surface is formed with V-shaped notches corresponding to those on the inner surface of the sheave to improve driving engagement. The belt engages another pulley (not shown), which is drivably connected to the crankshaft of an internal combustion engine.

Torque is transferred to the driveshaft from clutch hub 22 through a spline connection 20. Tension continuity between shaft and hub is provided by bolts 24 seated on a web of the hub and having screw threads engaging internal threads formed on the end of the driveshaft. Plate 26 is permanently fixed to the outer surface of the hub by swaging hub material into recesses formed in the plate to receive the swaged material, thereby producing a torsional connection between these components. A resilient drivable connection between the hub plate and a clutch disc 28 is made through tension straps 30 located at approximately 120° intervals about axis A—A and joined at each of their ends by rivet 32, fixed to the disc, and rivet 34, fixed to the plate.

A pulley assembly includes the pulley and disc 36, located adjacent the face of clutch disc 28 and joined permanently to sheave 14; axial extending flange 38; bearing 40, located within a pocket between axial flange 42 extending from the pulley disc and parallel flange 44 integral with the compressor housing 10. The bearing supports disc 36 and sheave 14 in rotation on the compressor housing as the belt drives the sheave in rotation from the engine. A coil of copper wire wound about axis A—A is located within a coil retainer 48, located in a pocket between flanges 38 and 42. One axial end of the coil is fitted within a bobbin 50. The opposite axial end of the coil is potted within retainer 48 by flowing uncured plastic resin sealant 52 over the annular end of the wire coil and containing the epoxy within the retainer.

The ends of the wire forming the coil are lead from the retainer to an electrical connection on the blades of a plug 52 and mating receptacle 54 carrying DC current from a clutch control to the coil. When energized, the coil induces an electromagnetic field that causes clutch disc 28 to move axially into engagement with the adjacent surface of the pulley disc 36. When this occurs, tension is developed in the straps and the hub plate is rotatably driven by the straps due to the riveted connection at each of their ends. Hub 22 is driven rotatably by the swaged connection at the inner surface of the hub plate, and driveshaft 12 is driven from the hub through spline 20. The clutch controller is adapted to frequently cycle the electrical current supplied to the coil 46 for periods normally lasting seven or eight seconds, i.e., about four cycles per minute, in order to minimize the accessory load placed on the engine for purposes of fuel consumption.

Figure 2:
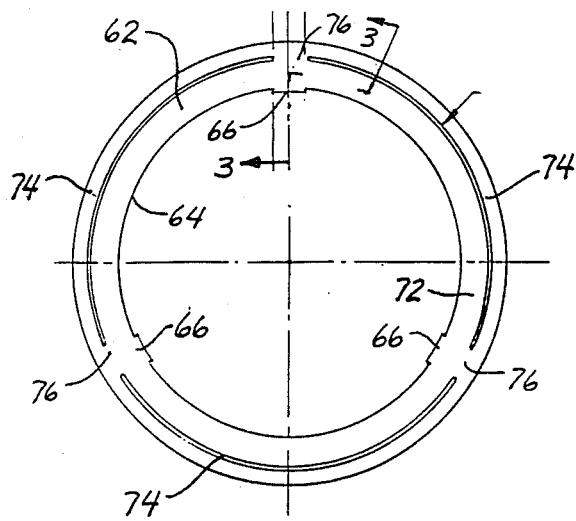
FIG. 2 is an end view taken in direction 2 of FIG. 3 of a sheave according to this invention.
Figure 3:
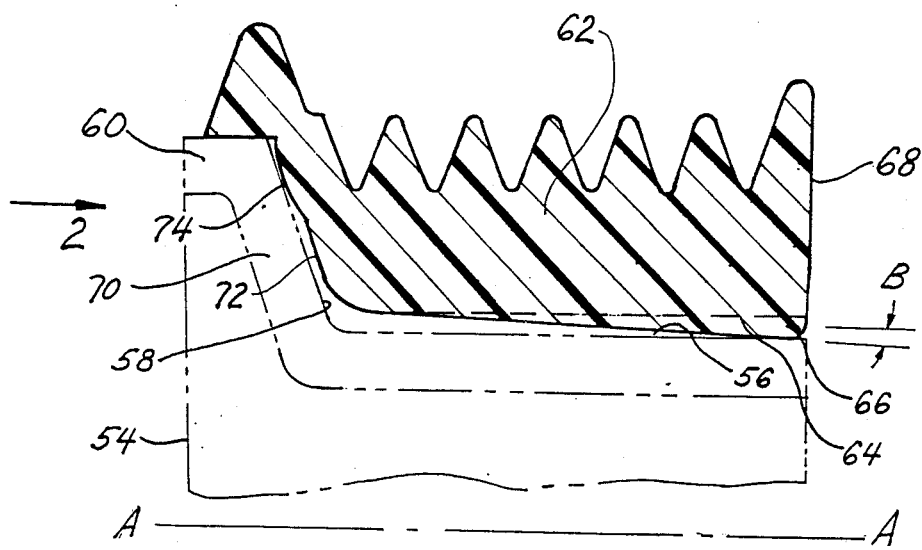
FIG. 3 is a cross section taken at plane 3—3 of FIG. 2.

FIGS. 2 and 3 show a second form of the sheave and pulley. Here pulley 54, formed of low carbon steel, has a cylindrical mounting surface 56 coaxial with A—A and a conical inclined surface 58 intersecting the mounting surface and inclined radially outward therefrom to a short cylindrical flange 60. The sheave 62 is molded of a thermosetting plastic compound, such as DUREZ Thermosets 31735, sold by Occidental Chemical Corporation; North Tonawanda, New York. This fiber reinforced phenolic material is specifically formulated to achieve wear resistance, dimensional stability, creep resistance, compression strength, impact strength, and weight required for a sheave operating in an automotive accessory drive system.

The sheave includes a first surface 64 the inside diameter, which is textured for optimizing adhesive bonding to the mounting surface of the pulley. The external surface of the sheave is molded with V-shaped grooves to facilitate driving engagement with the drivebelt. Several rails 66, distributed at approximately 120° intervals about the central axis of the shaft, extend from surface 64 radially inward a predetermined depth and extend circumferentially a short width. The depth of the rails is greatest at the free end 68 of sheave 62, the end distant from inclined surface 72, and decreases linearly in the direction of the inclined surface along slope B, about two degrees, as distance from the free end increases. Therefore, when the sheave is fitted over the mounting surface by moving the sheave leftward, when viewed as in FIG. 3, the rails and mounting surface 56 have ample clearance when the pulley first enters the sheave. However, as the sheave and pulley move further toward the position of FIG. 3, the rails gradually contact the mounting surface and become seated on the mounting surface in the vicinity of free end 68.

The sheave includes an inclined face 72 located after assembly adjacent the inclined face 58 of pulley flange 70. Stop beads 74, located on the inclined or second surface 72 of the sheave, extend a short distance axially toward the inclined surface 58 of the pulley, and angularly substantially the entire circumference of the sheave. FIG. 2 shows the stop beads are interrupted to define vent passages 76, the plane portion of surface 72 where the beads are absent. When the stop bead contacts the inclined surface of the pulley during the assembly process, the lateral center line of the sheave is correctly located on the pulley.

The sheave is bonded to the rail using an epoxy structural adhesive, such as Fusor 320 or 321 sold by Lord Corporation, Erie, Pennsylvania. The epoxy material includes rubber adhesives to provide flexibility needed to compensate for differences in thermal expansion and contraction between the low carbon steel pulley and the phenolic sheave assembly. Bonding the sheave to the pulley begins by applying at room temperature a bead of epoxy adhesive around the periphery of the mounting surface at the end of the pulley farthest from inclined flange 70 or by applying a bead of epoxy to the first surface of the sheave in the vicinity of the intersection of inclined surface 72 and first surface 56. The volume of the epoxy adhesive applied should be sufficient to adequately wet the surfaces of the sheave and pulley with adhesive and to fill the arcuate spaces between and below the rails and the space between the inclined surfaces of the pulley and sheave.

After the bead of adhesive is applied, the sheave is moved axially over the mounting surface until the stop beads contact the inclined surface 58. Before the epoxy adhesive begins to polymerize, the sheave may be rotated on the pulley a sufficient amount to assure that the adjacent surfaces of the sheave and pulley are contacted by the adhesive. Next, the relative positions of the sheave and pulley are maintained and the components in that position are heated in an oven for about ten minutes at 250° F. during which period the epoxy polymerizes. Then the parts are removed from the oven and allowed to cool to room temperature. Excess epoxy material in the precured condition extrudes between the stop beads through the vent ports to indicate an adequate volume of adhesive has been applied.

Figure 6:
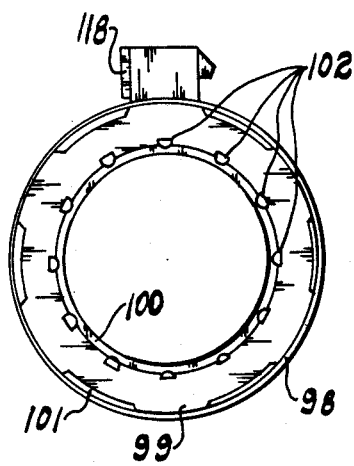
FIG. 6 is a bottom view of a field coil assembly.
Figure 15:
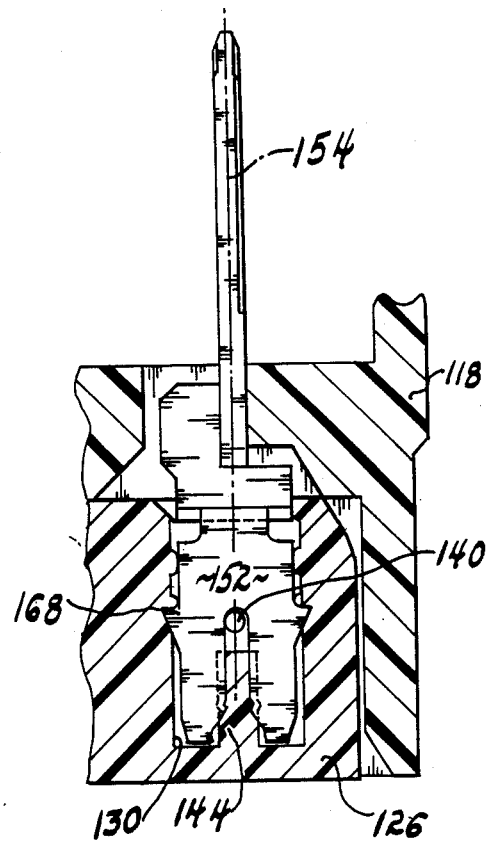
FIG. 15 is an end view partially in cross section of a field coil housing assembly viewed in direction 15—15 of FIG. 5.
Figure 5:
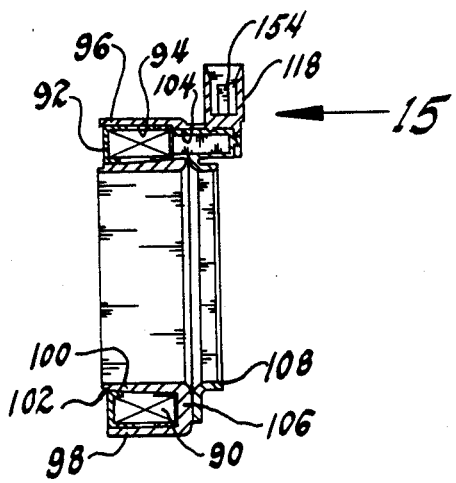
FIG. 5 is a cross section taken at plane 5—5 of FIG. 4.
Figure 4:
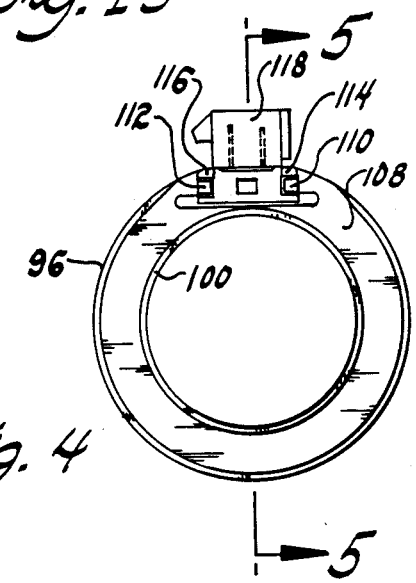
FIG. 4 is a top view of the field coil assembly.

Referring now to FIGS. 4–6, the coil 46 of copper wire wound in the form of a torus, is covered at its lower end by a cap 92, having a crown 99 formed with several recesses 101 through the crown thickness to prevent escape of air as the assembled wire torus enters housing 96, and at its upper end by a bobbin 94, and fitted within the toroidal cavity of field coil housing 96. The housing has a cylindrical outer wall 98 and a cylindrical inner wall 100, whose outer edge is deformed by swaging at several angularly spaced locations 102 to retain the field coil within the housing cavity. The lower end of the housing is otherwise open to facilitate insertion of the coil assembly into the cavity and is closed at the axially opposite end, except for an aperture 104 by an annular web 106 connecting the inner and outer walls. The aperture permits a portion of the coil assembly to extend outward from the housing. The web carries a ring 108 welded to the outer surface of the web and having an aperture aligned with that of the web, through which a portion of the coil assembly extends. To support and retain the sleeve in position on the housing, the ring includes tangs 110, 112 that are bent to engage flanges 114, 116 extending outward from a connector sleeve 118.

Referring next to FIGS. 7–10, bobbin 94 includes a cap 120 in the form of an annular plane contacting an axial end of the coil and two legs extending along the coil perpendicular to the cap, each leg having a terminal lip contacting the inner surface of the housing. Each of the ends of the wire spooled to form the coil is threaded through one of the holes 122, 124 that passes through the cap of the bobbin. The bobbin is formed also with a terminal post 126 extending outward from the cap through which the lead wires that pass through holes 122, 124 are lead. The side walls of the post are formed with a recess that surrounds the post on three of its four rectangular sides. Near the axial outer end of the post are two apertures 130, 132 through which the wires are accessed from outside the post. Holes 122, 124 are each aligned with wire supports 134, 136 which are in the form of semicircular bosses extending axially beyond the top 190 of the post 126 a short distance and axially within apertures 132, 134 a short distance. When the wires 140, 142 are lead through holes 122, 124 they are pulled sufficiently far through the holes so that they can be supported on the wire supports 134, 136 and extend a short distance beyond the ends of the supports, as shown in FIGS. 9 and 10. On the back wall of the post across from the apertures 130, 132 are wire support bosses 144, 146 spaced short distances 148, 150 below the lower end of the wire supports 134, 136 and above the lower surface of the chamber to which apertures 130, 132 open.

Figure 11:
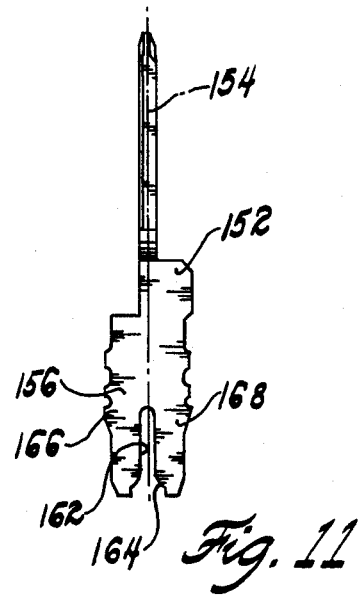
FIG. 11 is a top view of a field coil terminal.
Figure 12:
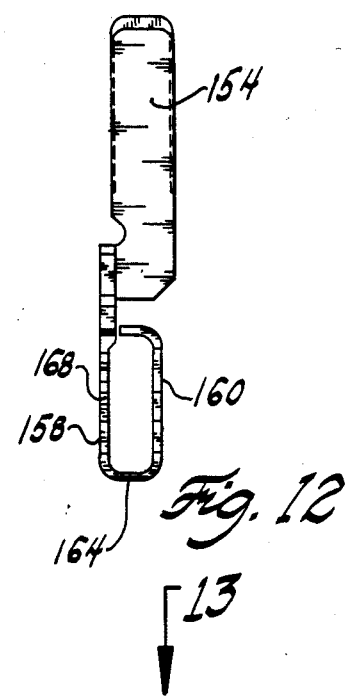
FIG. 12 is a side view of the terminal of FIG. 11.

Referring next to FIGS. 11 and 12, each field coil terminal 152, made from bent sheet metal, includes a blade 154 extending outward from a wire contact section 156. The upper and lower surfaces 158, 160 of section 156 includes an elongated slot, whose width is slightly less than the diameter of the insulated wire ends, and guide surfaces 164 by which the wire ends are directed into the slots. At the extremity of section 156, the end wall has an opening 164 sized slightly larger than bosses 146, 144 on the bobbin post. The width of slots 162 is sized so that, when the wire is supported on the wire support and bosses, the edges of the slots cut through the insulation and the current carrying portion of the wire makes a low resistance electrical connection with the edges of the slots. Surfaces 158, 160 are flat and have a width sized to fit within apertures 130, 132 on the bobbin post and to be retained there by frictional engagement. The tangs 166, 168 define sharp edges which grip the sides of the apertures and resist the tendency for the terminals to be removed from the apertures in which they are fitted due to frictional contact between the receptacle that engages blades 154.

Figure 13:
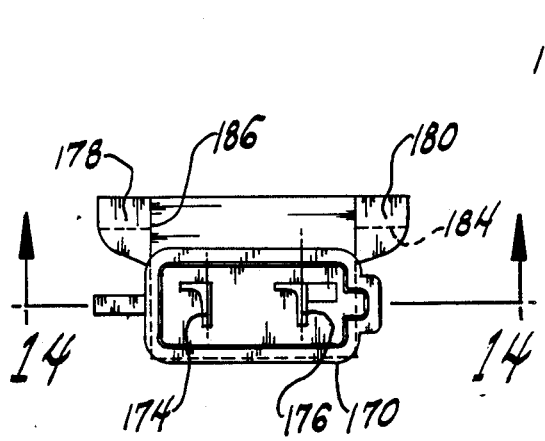
FIG. 13 is an end view of a wiring sleeve.
Figure 14:
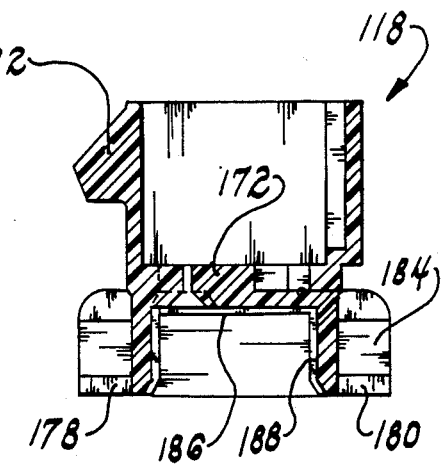
FIG. 14 is a cross section taken at plane 14—14 of the sleeve of FIG. 13.

The wiring sleeve 118, shown in FIGS. 13 and 14, is in the general form of a rectangular cylinder 170 having an intermediate web 172 formed with two L-shaped slots 174, 176 sized and located so that the blade 154 of each terminal passes through the interior portion of the sleeve, that portion adjacent mounting flanges 178, 180 to the exterior portion, adjacent receptacle retaining flange 182. Each of the mounting flanges is formed with a recess 184 into which a tang 110, 112 ring 108 of the coil housing bent to mechanically grasp the sleeve and maintain its position on the upper surface of the ring. Flange 182 provides a surface over which a plug receptacle moves and becomes latched in the process of inserting the receptacle within the sleeve to electrically engage the blade with positive mechanical grasping force. A rectangular hole 186 extending through the lower wall of the sleeve is sized to receive the terminal post. A bead 188, formed around the edge of hole 186, is sized to fit within recess 128 on the mounting post with an interference fit. This engagement locates the post properly within the sleeve and further helps retain the sleeve and post in position after assembly.

Assembly of the field coil involves forming a toroidal coil of wire about a central axis, placing the lower cap 92 and bobbin 94 on the axial ends of the coil, and directing the ends of the wire coil through the holes 122, 124 in the bobbin cap and post. The lead wires extend sufficiently far beyond the outer surface of the post so that they extend past the wire supports 134, 136, as indicated in FIG. 9. Then, a shearing knife cuts the ends of the wire and supports 134, 136 at plane 190, the outer surface of the post. Next, each terminal is fitted within an aperture and forced toward the back wall of the post, thereby bringing the insulated wire into contact with the end of slot 162. As the terminal is forced yet further through the aperture of the post, its upper and lower surfaces 158, 160 are fitted between the clearance spaces 148, 150 between the edge of the aperture and the wire supporting boss 144, 146. As this occurs, and while supported on boss 144 or 146, each wire moves along the sharp cutting edges of the slot, the insulation is cut, and the edges of slots 166 contact and forceably grip the current conducting wire core. When the ends of the terminals are seated in the apertures such that the support bosses 144 become located within holes 164 at the end of the terminal, the ends of the wire sheared at plane 190 are drawn entirely within the top surface of the post and an electrical connection is made between each wire and its corresponding terminal.

The coil, cap, bobbin, and terminal are located within the toroidal space defined by the coil housing. Next, the beads 186 on the sleeve are aligned with the slots 128 on the post and the terminal blades are forced through slots 170, 174 in the web of the sleeve, which then slide along the recess until the adjacent surface of the web contacts the outer face of the post. Finally, the assembly is completed when the mounting tabs on the housing ring are bent downward into the recesses 184 on the mounting flanges of the sleeve.

Having described the preferred embodiment of my invention, what I claim and desire to secure by U.S. Letters Patent is:

1. A field coil assembly for an electromagnetically actuated device comprising:
   a coil of wire having an inner surface, an outer surface, and axial ends;
   a cap located at a first axial end of the coil, having flanges extending along the inner surface and outer surface of the coil, covering said end of the coil;
   a bobbin located at the opposite end of the coil from the location of the cap, having flanges extending along the inner surface and outer surface of the coil, covering the opposite axial end of the coil;

a housing defining a toroidal cavity containing the coil, bobbin and cap, the cavity being substantially open at one end and bounded by inner and outer walls, a portion of one of said walls extending into the cavity at the open end to prevent movement of the coil and cap therepast.

2. The assembly of claim 1 further comprising:
a terminal post having walls extending from the bobbin, a hole through which an end of the wire forming the coil passes, a surface for supporting the wire along its length near its end, an aperture through a wall of the terminal post opening from outside the terminal post to the wire end adjacent the support surface.

3. The assembly of claim 2 further comprising:
a terminal having a blade and a contact portion, said contact portion adapted to enter the aperture, having a knife edge aligned with the wire end adjacent the support surface, and a slot adapted to receive a wire end therein and to make relatively low resistance electrical contact with the wire.

4. The assembly of claim 1 wherein the flanges of the cap include first and second flanges gripping the inner and outer surfaces of the coil between said flanges, first outer surfaces of said first flange contacting a surface of the coil housing along multiple angularly spaced circumferential lengths, second outer surfaces of said first flange located between adjacent first outer surfaces and spaced radially from the housing surface.

5. The assembly of claim 1 wherein the flanges of the bobbin include first and second flanges gripping the inner and outer surfaces of the coil between said flanges, each flange having a lip directed toward a surface of the coil housing, engaging the adjacent surface of the coil housing with an interference fit.

6. The assembly of claim 1 wherein:
the flanges of the cap include first and second flanges gripping the inner and outer surfaces of the coil between said flanges, first outer surfaces of said first flange contacting a surface of the coil housing along multiple angularly spaced circumferential lengths, second outer surfaces of said first flange located between adjacent first outer surfaces and spaced radially from the housing surface; and
the flanges of the bobbin include first and second flanges gripping the inner and outer surfaces of the coil between said flanges, each flange having a lip directed toward a surface of the coil housing engaging the adjacent surface of the coil housing with an interference fit.

7. A field coil assembly for an electromagnetically actuated device comprising:
a coil of electrically insulated wire having two wire ends extending therefrom;
a cap covering an axial end of the coil, having holes through each of which a wire end passes, a terminal post having surfaces for supporting the wire ends along their lengths, apertures for accessing from outside the terminal post the wire ends adjacent the support surfaces, and a recess formed on the outer surface thereof;
a terminal having two substantially parallel blades, two contacts, each contact adapted to enter an aperture, each contact having a knife edge aligned with the wire ends adjacent the support surfaces, a slot adapted to receive a wire end therein;
a connector sleeve defining a space within which the terminal post is located, a bead fitted within the recess, a web defining slots through each of which a terminal clip blade passes, a shell covering said blades defining a receptacle, a mounting flange extending outward from the shell;
a bobbin covering an end of the coil;
a coil housing defining a toroidal cavity containing the coil, cap, and bobbin, the cavity being open at one end and covered with a closure ring, the ring having an aperture through which the terminal post passes, the cavity being bounded by inner and outer walls, the material of one of said walls being deformed into the cavity at the open end to prevent movement of the bobbin therepast.

8. A method for assemblying a field coil, comprising:
winding a toroidal coil of insulated wire having relatively low electrical resistance, the coil having axial ends;
molding a cap adapted to cover a first end of the coil and having flanges extending along the inner surface and outer surface of the coil;
fitting the cap over the first end of the coil;
molding a bobbin adapted to cover a second end of the coil having flanges extending along the inner surface and outer surface of the coil;
fitting the bobbin over the second axial end of the coil;
forming a housing having a toroidal cavity being substantially open at one end and bounded by inner and outer walls;
inserting the coil, bobbin and cap into the housing cavity; and
deforming a portion of one of the housing walls into the housing cavity at the open end of said cavity to prevent movement of the coil and cap therepast.

* * * * *